United States Patent [19]

Kulischenko et al.

[11] 4,416,644
[45] Nov. 22, 1983

[54] FLEXIBLE SHAFT ASSEMBLY WITH UNIVERSAL ADAPTER

[75] Inventors: Walter Kulischenko, East Brunswick; William F. Bogan, Somerville; William C. Ellis, Bridgewater, all of N.J.

[73] Assignee: Pennwalt Corporation, Philadelphia, Pa.

[21] Appl. No.: 344,462

[22] Filed: Feb. 1, 1982

[51] Int. Cl.³ .............................. F16C 1/02; F16C 1/08
[52] U.S. Cl. ........................................ 464/52; 81/185; 403/351
[58] Field of Search ............... 464/52, 51, 53, 179, 464/181, 182, 183, 174, 901; 285/176; 403/3, 4, 361, 351; 251/293, 294; 81/DIG. 11, 185, 121 R

[56] References Cited

U.S. PATENT DOCUMENTS

| | | | |
|---|---|---|---|
| 461,771 | 10/1891 | Cottrell | 81/185 X |
| 939,788 | 11/1909 | Bartok | 81/185 X |
| 1,170,138 | 2/1916 | Bohne | 251/293 X |
| 2,233,962 | 3/1941 | Rover | 403/3 |
| 2,368,457 | 1/1945 | Eisenbeis | 464/52 |
| 2,487,696 | 11/1949 | Coffing | 403/4 |
| 2,747,384 | 5/1956 | Beam | 464/174 X |
| 3,433,108 | 3/1969 | Ondeck | 81/185 X |

Primary Examiner—Stuart S. Levy
Assistant Examiner—Dao Van Huynh

[57] ABSTRACT

A handwheel rotates an improved flexible shaft assembly which causes a socket member to rotate therewith. The socket seats an adapter therein which is uniquely configured to engage tapered square valve stems of different sizes and degrees of taper. The flexible shaft assembly is provided with a ferrule at the handwheel end and another ferrule at the socket end. The casing of the flexible shaft is free-positioning by virtue of the ability of the casing to slowly rotate in the ferrule provided at either the handwheel end, or at both the handwheel end and socket end, thus automatically relieving casing torsional stresses.

8 Claims, 6 Drawing Figures

FLEXIBLE SHAFT ASSEMBLY WITH UNIVERSAL ADAPTER

STATEMENT OF THE INVENTION

This invention relates to flexible shafts and more particularly to an adapter rotatable therewith which is engageable with a multiplicity of sizes of tapered square stems of remotely disposed valves to be controlled by rotation of the flexible shaft.

BACKGROUND AND SUMMARY OF THE INVENTION

Aboard ships; in nuclear, petrochemical, and water treatment plants; in the treatment of wastewater effluents, and the like, it is often necessary that valves of varying sizes be continuously opened, closed, or controlled. Heretofore, such valves were manually operated, or opened or closed completely or partially from a remote control point. Many of such valves are oftentimes controlled by a handwheel which controls the opening and closing of the remotely disposed or inaccessible valves by means of rotatable flexible shafts communicating therebetween. Since the stems of these valves are provided in a variety of configurations, typically a tapered square of varying lengths and degree of taper, it was necessary that the flexible shaft assemblies be specifically fitted with adapters which would engage the particular valve stem being controlled. It was thus necessary to maintain an inventory of assorted adapters which added to the overall expense of plant operation, as well as requiring constant and time-consuming change-overs.

Further, in the marine valve industry, for example, in some cases it is the practice for sealing material to leak slightly from the valve gland nut to prevent excessive drying of the enclosed sealing material. The universal-type adapter of the present invention permits the gland nut to "leak" since the adapter does not contact the gland nut. The leaked sealing material however does not adversely affect the present shaft assembly since it is completely watertight. Turning the gland nut does not twist the casing of the flexible shaft assembly used in the present device as in prior art devices since the casing remains completely free of the gland nut. The present casing is free-positioning, or free to rotate as torsional stresses are produced therein, thus obviating any need for expensive braided casings, and permitting inexpensive plastic tubing, for example, to be used in lieu thereof. The present flexible shaft assembly is water tight, a desirable feature for applications envisaged for the device to be hereinafter claimed.

Briefly, the flexible shaft rotates the present adapter which engages the tapered valve stem. The adapter is provided with a pair of coincident tapered intersecting square bores of different size, disposed symmetrically, such that a line drawn through opposing corners of either square bore bisects opposing sides of the other; and each side of the larger square bore is intersected by a portion of the smaller, and vice versa. Thus, either of the two tapered square bores, depending upon the length and degrees of taper thereof, is capable of engaging tapered valve stems of many different sizes.

DETAILED DESCRIPTION OF THE INVENTION

Reference is made to U.S. Pat. No. 4,185,474, to Kulischenko, for "Safeguard Coupling for Power Driven Flexible Shafts".

Figure 1A:
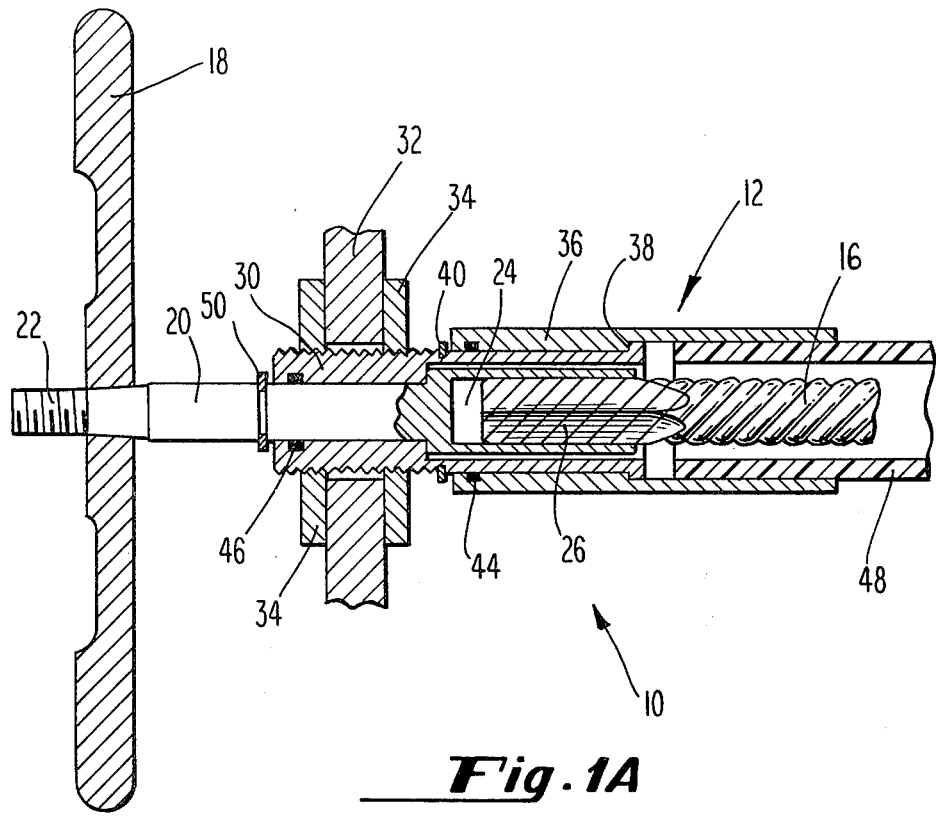
FIGS. 1A and 1B are longitudinal sectional views of the input and output portions respectively of a remote control rotatable flexible shaft coupling device employed in the present invention.
Figure 1B:
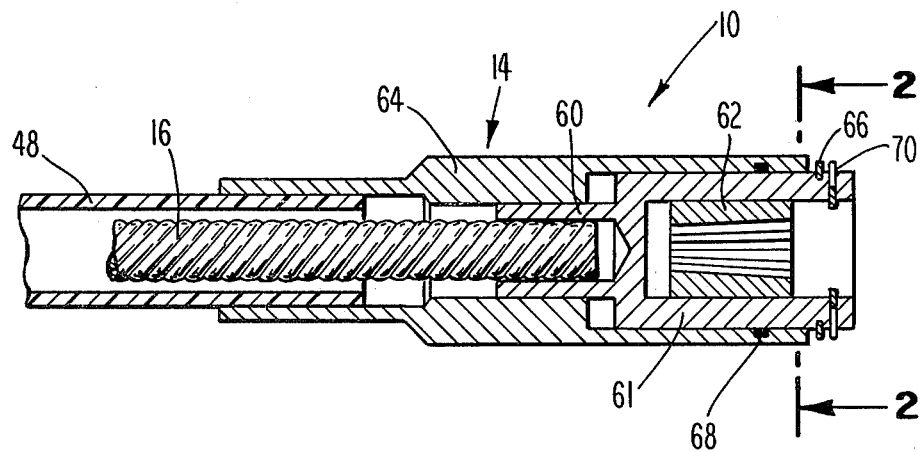

A coupling device 10 is shown in FIGS. 1A and 1B and comprises an input or driving end 12 and an output or driven end 14. Input end 12 includes a rotatable flexible shaft 16, one end of which is connected to a handwheel 18 through an end fitting member 20. End fitting 20 is provided with a threaded stem 22 which receives a nut (not shown) for securing handwheel 18 in place. The inner end of end fitting 20 includes a conventional hollow drive square 24 which receives a conventional integrally formed square 26 of flexible shaft 16. Of course, the hollow drive may be hexagonal or otherwise suitably configured as well as the integrally formed end.

End fitting 20 is rotatable within sleeve 30. Sleeve 30 is secured to bulkhead or panel 32 by means of a pair of jam nuts 34 on each side thereof which threadedly receive sleeve 30. Ferrule 36 is rotatable about sleeve 30 by virtue of a close fit therebetween. Sleeve 30 is inserted through ferrule 36, prior to securing the sleeve to panel 32, such that mating shoulder portions 38 of sleeve 30 and ferrule 36 are in contacting relationship. Retaining ring 40 on sleeve 30 limits longitudinal movement of ferrule 36. O-rings 44 and 46 are provided as shown in FIG. 1A. Integrally formed square 26 is permanently swaged within hollow square 24 of end fitting 20. End fitting 20 is inserted into sleeve 30. Casing 48 is permanently affixed within the inner end of ferrule 36 by swaging, for example, such that ferrule 36 is permitted to rotate freely over sleeve 30. As aforementioned, casing 48 may be inexpensive plastic tubing and need not comprise the considerably more expensive conventional braided material since the casing is free-positioning and will therefore freely rotate under torsional stress to thereby relieve itself of such stresses. A retaining ring 50 on sleeve 30 limits inward movement of the flexible shaft assembly.

Figure 3:
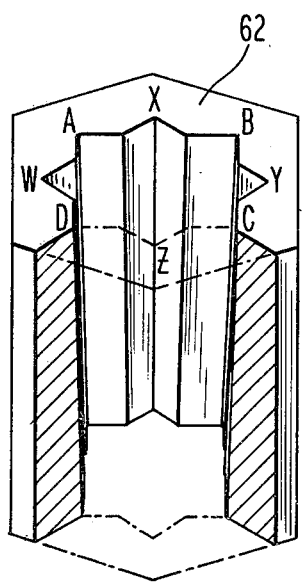
FIG. 3 is a cutaway perspective view of the adapter of FIG. 2.

At the output end 14, or valve end of the coupling device 10 (FIG. 1B), flexible shaft 16 is permanently secured to the inner end of fitting 60, by swaging, for example. The outer portion of fitting 60 is provided with a socket 61, having an inner cross-section which is preferably hexagonal (FIG. 3). Socket 61 receives an adapter member 62 therein for engaging the valve stem to be controlled. Ferrule 64 is permanently swaged over casing 48. Socket 61 is rotatable within ferrule 64. Retaining ring 66 limits inward movement of socket 61 into ferrule 64 and an O-ring 68 is provided therebetween. The O-rings of device 10 provide a measure of water or liquid tightness thereto. The lack of any contact of the present device with the gland nut N of Valve V (FIG. 5), as aforementioned, eliminates a possible additional source of liquid leakage into the present device. Threaded nut 72 holds adapter 62 in place around valve stem S.

A locking ring 70 locks adapter 62 within socket 61. Removal of locking ring 70 permits socket 61 to be readily withdrawn from adapter 62.

Figure 2:
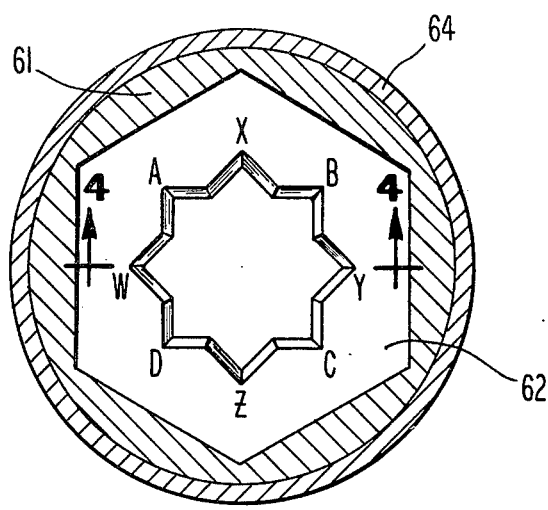
FIG. 2 is a sectional view of the device of FIG. 1B taken along line 2—2 thereof, showing the configuration of the adapter member.
Figure 4:
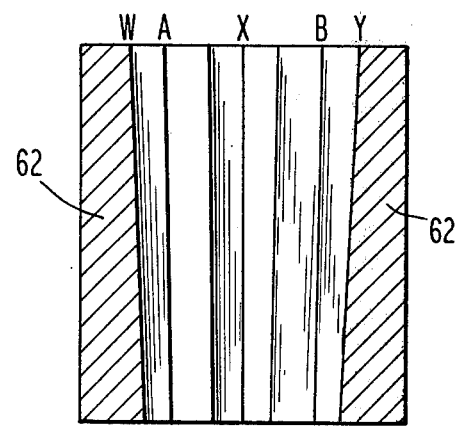
FIG. 4 is a sectional view of the adapter of FIG. 2 taken along line 4—4 thereof.

Referring to FIGS. 2, 3 and 4, adapter 62 is provided with a pair of coincident tapered intersecting square bores, i.e., a smaller square bore ABCD and a larger square bore WXYZ. Portions of the square bores are coincident with each other. Both square bores are illustrated similarly and uniformly tapered the length of adapter, it being understood that one may be provided with a greater degree of taper. Both square bores have each side centrally symmetrically bisected by a corner portion of the other.

Figure 5:
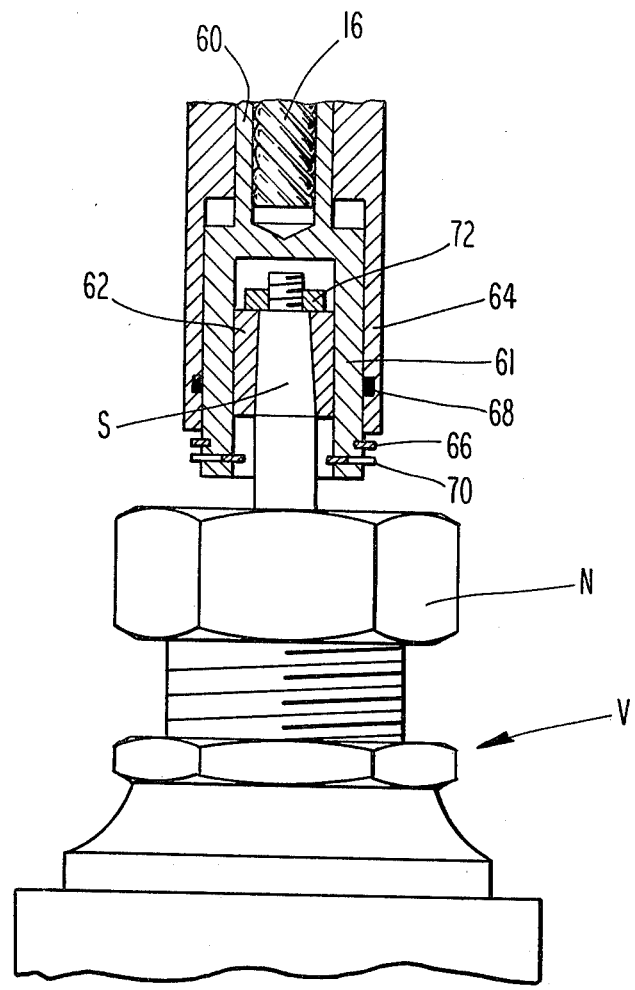
FIG. 5 is a partially sectioned view illustrating a tapered valve stem engaged by the adapter of the present invention.

In use, a suitable adapter 62 is seated over valve stem S, and nut 72 tightened thereon. Socket 61 may then engage adapter 62 and locking ring 70 placed on socket 61 (FIG. 5). Since casing 48 is free-positioning and therefore automatically relieved of torsional stresses, valves having stems S inverted, i.e., disposed downwardly, may similarly be controlled by maintaining the adapters in constant engaging relationship to the stems by means of locking ring 70, while casing 48 is supported by retaining rings 66 and 40.

Fabrication of adapters 62 is preferably accomplished by the casting process, although they may readily be forged, coined, or sintered using powder metallurgy techniques.

We claim:

1. Apparatus for turning a valve stem of a valve by means of a handwheel rotating a flexible shaft, said apparatus comprising:
    a sleeve mounted in a supporting member,
    means rotatable within said sleeve and interconnecting one end of said flexible shaft with said handwheel, said flexible shaft having an outer casing in longitudinal alignment with said sleeve,
    a first ferrule rotatably mounted over an inner end of said sleeve and affixed to one end of said casing,
    a socket member secured to the other end of said flexible shaft,
    a second ferrule secured to the other end of said casing, said socket member rotatably mounted within said second ferrule, and
    other means seated within said socket member for engaging said valve stem whereby rotation of said handwheel and flexible shaft causes said socket member to rotate therewith while said first ferrule is independently rotatable to automatically relieve torsional stresses in said casing, said second ferrule and said first ferrule rotating in accordance with each other and said ferrules rotating said casing.

2. Apparatus of claim 1 wherein said first ferrule and said sleeve have mating shoulder portions for limiting longitudinal movement therebetween.

3. Apparatus of claim 1 wherein said casing comprises plastic tubing.

4. Apparatus of claim 1 wherein said valve stem comprises a tapered square and said other means is an adapter adapted to engage a plurality of said tapered stems of different sizes and degrees of taper.

5. Apparatus of claim 4 wherein said adapter is provided with a pair of different sized tapered intersecting square bores axially therethrough such that a line drawn through opposing corners of either square bore bisects opposing sides of the other.

6. Apparatus of claim 5 wherein both of said square bores have each side thereof centrally symmetrically intersected by a corner portion of the other.

7. Apparatus for turning a valve stem of a valve by means of a handwheel rotating a flexible shaft, said apparatus comprising:
    a sleeve mounted in a supporting member,
    means rotatable within said sleeve and interconnecting one end of said flexible shaft with said handwheel, said flexible shaft having an outer casing in longitudinal alignment with said sleeve,
    a first ferrule rotatably mounted over an inner end of said sleeve and affixed to one end of said casing,
    a socket member secured to the other end of said flexible shaft,
    a second ferrule secured to the other end of said casing, said socket member rotatably mounted within said second ferrule,
    other means seated within said socket member for engaging said valve stem whereby rotation of said handwheel and flexible shaft causes said socket member to rotate therewith while said first ferrule is independently rotatable to automatically relieve torsional stresses in said casing, said second ferrule and said first ferrule rotating in accordance with each other, said ferrules rotating said casing, said valve stem comprising a tapered square and said other means is an adapter adapted to engage a plurality of said tapered stems of different sizes and degrees of taper, said adapter being provided with a pair of different sized tapered intersecting square boxes axially therethrough such that a line drawn through opposing corners of either said square bores bisects opposing sides of the other of said square boxes.

8. Adapter member of claim 7 wherein each of said square bores has each side thereof centrally symmetrically intersected by a corner portion of the other.

* * * * *